UNITED STATES PATENT OFFICE.

CARLETON ELLIS, OF MONTCLAIR, NEW JERSEY, ASSIGNOR TO NATHANIEL L. FOSTER, OF MONTCLAIR, NEW JERSEY.

SEASONING MATERIAL AND PROCESS OF MAKING SAME.

1,056,649.   Specification of Letters Patent.   Patented Mar. 18, 1913.

No Drawing.   Application filed September 5, 1911.  Serial No. 647,681.

*To all whom it may concern:*

Be it known that I, CARLETON ELLIS, a citizen of the United States, and a resident of Montclair, in the county of Essex and State of New Jersey, have invented certain new and useful Improvements in Seasoning Material and Processes of Making Same, of which the following is a specification.

This invention relates to a pulverulent vegetable saline composition and to the process of making same, and relates in particular to seasoning materials such as those comprising the highly flavored edible species of the genus *Allium*, including onion and garlic; as will be more fully hereinafter described and claimed.

It has been heretofore suggested that onions be used as a seasoning and flavoring material, by mixing with more or less salt and drying out the material to make flakes of the onion material more or less coated with salt.

The present invention has to do more particularly with a saline composition in a dry pulverulent form, preferably largely free from garlic or onion fiber, but treated so as to obtain a powerful seasoning and flavoring composition, which retains its flavor and characteristic odor for a long period of time.

If onion or a mixture of onion and garlic is dried in the presence of salt in an ordinary drying oven under atmospheric pressure, a product is produced which is rather dark in appearance as a rule and therefore rather unsightly. This material is also likely to undergo decomposition through oxidation, etc., so that after a time, on exposure, the characteristic odor of the fresh vegetable is lost. Even in drying, changes take place which bring about undesirable modifications in the odor of the product. This is apparently due to the presence of a large amount of fiber, which acts as an absorbent material to hold the vegetable juices imprisoned and away from the preservative action of the salt. Merely mixing up onion or garlic leaves or choppings with salt and allowing the same to dry under atmospheric pressure in an ordinary drying oven for example, does not give the proper contact with salt of all the vegetable juices, as osmotic action is too feeble to secure a complete diffusion and intermingling of the salt and juices within the fibers.

The present invention has to do more particularly with the combination of onion juices substantially freed from fiber, with garlic and the requisite amount of a saline preservative, as common salt, and the drying of this material preferably under reduced atmospheric pressure, by the partial or complete removal of the onion fibers, an improved diffusion of the saline matter occurs, or in case of the entire absence of fiber, a perfect intermingling of the onion juices and the salt comes about, resulting in a product which preserves its characteristic odor and flavor for an indefinite time.

In carrying out the invention, I preferably comminute fresh onions into small particles and place this comminuted mass in a powerful press, thereby expressing substantially all the juices of the onion. This juice is then combined with chopped garlic and salt to make a paste and evaporated in a vacuum pan, preferably under a fairly high vacuum, until the water has been substantially removed. The product is then readily ground, when it may be mixed with starch or any other filling material which tends to maintain salt in a dry, readily flowing state. Carbonate of lime, in particular, tends to preserve the neutrality of the composition when exposed under severe service conditions. A suitable proportion of the material for making onion salt is 1¾ pounds of chopped onions, 12 ounces fresh garlic, and 4¼ pounds salt. The juice of the onions preferably is first expressed as above described, combined with the garlic and salt and when thoroughly incorporated, placed in a vacuum pan, drying until freely pulverulent and easily ground. This mixture is preferably combined with one pound of calcium carbonate or one and one-half pounds of starch. By drying *in vacuo*, in the presence of a great bulk of salt, the characteristic odor and flavor of the vegetable is preserved. Ordinarily I do not wish to introduce readily-decomposable fiber into the material and therefore in the case of a seasoning material containing onion I preferably employ the clear juices of the onion in mixing the present composition. It is possible to employ the vacuum pan to remove the moisture from the comminuted material which has been combined with salt and subjected to vacuum drying and to subsequently remove the fiber if desired. After being dried in the presence of salt, the fiber is particularly hard to grind and is usually badly discolored, and for this and other reasons, is usually considered objectionable, and I therefore, when operating under such conditions, after having dried the salt, onion juices and fiber together in the vacuum pan, subject them to a preliminary grinding, and am then able to bolt or treat by air flotation or otherwise to remove the fiber, or a substantial part of it, thereby giving an improved product much more satisfying in appearance and odor than when the entire amount of fiber remains. On the other hand garlic is not so readily oxidizable as onion under these circumstances, so far as can be determined; and as this material is a powerful seasoning material it furthermore does not need to be used in proportions as large, to secure a like seasoning effect. Garlic does not have a very large proportion of juices, which can be easily expressed, hence it is better in this case to comminute the fresh garlic, mix with salt, and dry under reduced atmospheric pressure, although this method of drying may be dispensed with and the product dried by exposure to mild heat under ordinary atmospheric pressure. A composition of this character is made by mixing one pound of garlic choppings with four pounds of salt and drying in the open air at about 45 degrees C. If desired the product may be given a final desiccation in a vacuum pan, which aids in the subsequent grinding operations.

The proportions of onion to salt or of garlic, onion and salt or other vegetable and saline matter coming under the purview of this invention is of course adjusted to popular requirements, and the seasoning material may be provided in various strengths and flavors according to circumstances.

The vacuum drying of onion or similar vegetables containing readily decomposable or oxidizable oils and juices cannot be carried out to advantage except in the presence of a great mass of salt or similar preservative and absorbent and the present invention takes advantage of the peculiar properties derived from incorporation in this way to secure a finely blended composition substantially free from oxidized and ill-smelling or even deleterious bodies formed in the protracted drying of onion under ordinary atmospheric pressure.

This application is a continuation of my application Serial No. 619,706 filed April 8, 1911 which has matured into Patent No. 1,002,506.

To recapitulate, my invention consists, broadly speaking, in the combination of alliaceous seasoning material and the like, the vegetable material preferably being in a comminuted condition or expressed form, and the salt preferably being in a finely divided state, and in drying the product preferably under a reduced or greatly reduced atmospheric pressure, and at a relatively low temperature; and consists more particularly in drying the expressed juices of the onion in combination with garlic and salt so as to form a substantially fiber free composition, having a strong characteristic odor of fresh onions or onions and garlic, the composition being rendered more flowable by the addition of a non-hygroscopic extending material, such as starch and the like.

What I claim is:—

1. A composition of matter adapted for use as a seasoning material, comprising substantially-unoxidized vacuum-dried onion-juices intimately associated with an excess of common salt and carrying garlic.

2. A composition of matter comprising garlic, onion juice and salt, said composition being substantially free from moisture.

3. A composition of matter comprising garlic, onion juice and salt, said composition being substantially free from moisture and being in a pulverulent form.

4. As a seasoning material, a mixture comprising vacuum-dried garlic and salt.

5. As a seasoning material, a mixture comprising vacuum-dried onion juice, garlic and salt.

6. As a seasoning material, a mixture of onion juice, garlic and salt, said composition being vacuum dried and free from products of oxidation.

7. As a seasoning material, a mixture of onion juice, garlic and a saline preservative in predominating amount, said composition being pulverulent.

8. As a seasoning material, a mixture of substantially unoxidized onion juice, garlic and salt in a dry form.

9. A composition of matter adapted for use as a seasoning material, comprising substantially unoxidized vacuum dried onion juice intimately incorporated with common salt and garlic, said composition being in a dry pulverulent form.

10. A composition of matter adapted for use as a seasoning material, comprising a pulverulent product comprising vacuum dried onion juices intimately associated with common salt and a toning material as garlic.

11. A composition of matter adapted for use as a seasoning material, comprising a pulverulent product comprising vacuum dried onion juices intimately associated with common salt and garlic in finely ground fibrous form.

12. A composition of matter adapted for use as a seasoning material, comprising garlic, salt and filling material.

13. A composition of matter adapted for use as a seasoning material comprising garlic, salt, onion and filling material.

14. A composition of matter adapted for use as a seasoning material, consisting of vacuum dried onion juices and garlic intimately associated with common salt and non-hygroscopic filling material, said composition being in a dry pulverulent form and having a yellowish green color.

15. A seasoning composition comprising a desiccated seasoning-vegetable comprising onion and salt, said composition being pulverulent.

16. A seasoning composition comprising a desiccated seasoning-vegetable comprising onion and a saline preservative, said composition retaining substantially the natural flavor of the seasoning vegetable for an indefinite time.

17. A seasoning composition comprising a vacuum-desiccated seasoning-vegetable comprising onion and a saline preservative, said composition retaining substantially the natural flavor of the seasoning-vegetable for an indefinite time, and being in a substantially pulverulent form.

18. A composition of matter adapted for use as a seasoning material, comprising substantially unoxidized and undecomposed vacuum-dried onion juice and garlic intimately incorporated with an excess of common salt but devoid of chemical combination therewith, said composition being in a dry pulverulent form and having the odor substantially of raw fresh onion.

19. The process of making a seasoning material which consists in comminuting onions, subjecting to pressure to remove the juices thereof, combining said juices with garlic and an excess of salt, drying the product under reduced atmospheric pressure, mixing the dried product with non-hygroscopic extending material and grinding to a fine powder.

20. The process of making a seasoning material which comprises subjecting onions to pressure to remove the juices thereof, combining said juices with garlic and salt, drying the product under reduced atmospheric pressure and grinding to a fine powder.

21. The process of making a seasoning material which consists in comminuting fresh onions, subjecting to pressure to remove the juices thereof, combining the juices with salt and garlic, drying under reduced atmospheric pressure, mixing the dried material with non-hygroscopic extending material and grinding to a fine powder.

22. The process of making a seasoning material which consists in incorporating a seasoning-vegetable comprising onions with saline preservative; whereby the juices of said vegetable become saturated with salty material, in proportioning the amount of seasoning-vegetable with respect to its content of readily decomposable or oxidizable juices or oils, to the amount of salt; in drying the material under reduced atmospheric pressure and in comminuting or grinding the product to a fine powder; whereby a pulverulent product possessing the natural odor of the fresh vegetable is secured.

Signed at Montclair in the county of Essex and State of New Jersey, this 31st day of August A. D. 1911.

CARLETON ELLIS.

Witnesses:
BIRDELLA M. ELLIS,
FLORENCE F. FOSTER.